(12) United States Patent
Zock

(10) Patent No.: US 11,459,984 B2
(45) Date of Patent: Oct. 4, 2022

(54) INTAKE MANIFOLD WITH A BLOW-OFF PRESSURE RELEASE VALVE

(71) Applicant: Richard Mellick Zock, Lapeer, MI (US)

(72) Inventor: Richard Mellick Zock, Lapeer, MI (US)

(73) Assignee: Zoom Zoom Parts LLC, Lapeer, MI (US)

( * ) Notice: Subject to any disclaimer, the term of this patent is extended or adjusted under 35 U.S.C. 154(b) by 0 days.

(21) Appl. No.: 17/451,040

(22) Filed: Oct. 15, 2021

(65) Prior Publication Data

US 2022/0220928 A1    Jul. 14, 2022

Related U.S. Application Data

(60) Provisional application No. 63/199,645, filed on Jan. 14, 2021.

(51) Int. Cl.
| | | |
|---|---|---|
| *F02M 35/10* | (2006.01) | |
| *F02M 35/104* | (2006.01) | |
| *F16J 15/3204* | (2016.01) | |

(52) U.S. Cl.
CPC .... *F02M 35/104* (2013.01); *F02M 35/10196* (2013.01); *F02M 35/10255* (2013.01); *F16J 15/3204* (2013.01)

(58) Field of Classification Search
CPC .......... F02M 35/104; F02M 35/10196; F02M 35/10255; F02M 35/1222; F16J 15/3204
See application file for complete search history.

(56) References Cited

U.S. PATENT DOCUMENTS

| | | | | |
|---|---|---|---|---|
| 3,139,080 A | * | 6/1964 | McMahon | ........... F01M 13/023 55/DIG. 19 |
| 3,938,329 A | * | 2/1976 | Van Basshuysen | ....... F01N 3/30 60/284 |
| 2012/0247857 A1 | * | 10/2012 | Oltmans | ................. F02B 37/00 180/219 |

* cited by examiner

*Primary Examiner* — Syed O Hasan
(74) *Attorney, Agent, or Firm* — Dunlap Bennett & Ludwig, PLLC

(57) ABSTRACT

An intake manifold with a blow off/pressure release valve, wherein the intake manifold may be a unitary construction of aluminum. The intake manifold utilizes a flat gasket at engine interface that, in combination with the aluminum construction, reduces the amount of heat transferred from the cylinder head to the intake manifold. The unitary construction of aluminum provides a strong bridge and conduit between the cylinder head and the carburetor.

5 Claims, 4 Drawing Sheets

INTAKE MANIFOLD WITH A BLOW-OFF PRESSURE RELEASE VALVE

CROSS-REFERENCE TO RELATED APPLICATION

This application claims the benefit of priority of U.S. provisional application No. 63/199,645, filed 14 Jan. 2021, the contents of which are herein incorporated by reference.

BACKGROUND OF THE INVENTION

The present invention relates to all-terrain vehicles and, more particularly, an intake manifold of unitary construction with a blow-off pressure release valve adapted to fit 1989-2004 YAMAHA BREEZE 125, 2004-2013 YAMAHA GRIZZLY 125, and other all-terrain vehicles (ATVs). The present invention contemplates a method of constructing and forming the intake manifold as well as a system of interconnecting the carburetor and motor of ATVs that incorporates the inventive intake manifold disclosed herein.

The above-mentioned ATVs utilize carburetors, as opposed to fuel injection systems, which are less complicated and less expensive to maintain. Existing original equipment manufacturer (OEM) or aftermarket intake manifolds for those ATV carburetors, however, are made from rubber or have one or more rubber portions, which can crack or break due to the motor either backfiring or the jarring (common with ATVs) movement (up, down, side to side) of the carburetor which is bolted to the intake.

Generally speaking, intake manifolds of carburetor engines are prone to failure due to the buildup of internal pressure in the motor. Specifically, when pressure is released back into the intake manifold, the pressure is trapped between the butterfly valve of the carburetor and the closed valve from the motor. The gases trapped therein, already heated and expanded, can cause the intake to fail under pressure. With current intake manifolds being rubberized or have rubber portions the tendency to fail under such internal pressures is inherently present. Furthermore, the above-mentioned cracking and breaking can cause the motor to not operate properly, requiring the intake manifold to be replaced. Over time, replacing multiple intake manifolds would become very costly. Troubling, the rubber portion can only last for a short period of time before breaking. The motor could also backfire which would crack the intake manifold.

As can be seen, there is a need for an intake manifold with a blow-off pressure release valve and a method of retrofitting said intake manifold in pre-existing ATVs, wherein the intake manifold is of unitary construction made of aluminum with no rubber components, and wherein the intake manifold is dimensioned and adapted to operatively associate with ATVs such as 1989-2004 YAMAHA BREEZE 125 and 2004-2013 YAMAHA GRIZZLY 125.

Additionally, the present invention, in case of a backfire, has a pressure release valve installed for releasing the pressure. Thus, the present invention would pay for itself over time for a user as compared to the user repeatedly buying multiple intakes manifolds.

SUMMARY OF THE INVENTION

In one aspect of the present invention, an intake manifold includes a manifold body extending between an engine flange and a carburetor flange, wherein the manifold body, the engine flange, and the carburetor flange consist of aluminum; and a pressure release valve hole disposed in the manifold body between the engine flange and the carburetor flange.

In another aspect of the present invention, the intake manifold further includes a first threading along the pressure release valve hole; a pressure release valve operatively associated with the pressure release valve hole in such a way as to release an internal pressure within the manifold body above a predetermine threshold to an exterior environment; a second threading along the pressure release valve, wherein the first threading and the second threading operatively associate, wherein an engine face of the engine flange and a carburetor face of the carburetor flange are not parallel.

In yet another aspect of the present invention, a method for fluidly connecting a carburetor and an engine of a vehicle, the system includes the following: providing an intake manifold including a manifold body extending between an engine flange and a carburetor flange, wherein the manifold body, the engine flange, and the carburetor flange consist of aluminum, wherein an engine face of the engine flange and a carburetor face of the carburetor flange are not parallel; and a pressure release valve operatively associated with the manifold body in such a way as to release an internal pressure therein above a predetermine threshold to an exterior environment; the method further includes and fluidly sealing the engine face to the engine with a planar gasket having a surface approximately coextensive with the engine face; and sealing the carburetor flange to the carburetor by way of an O-ring.

These and other features, aspects and advantages of the present invention will become better understood with reference to the following drawings, description and claims.

DETAILED DESCRIPTION OF THE INVENTION

Figure 1:
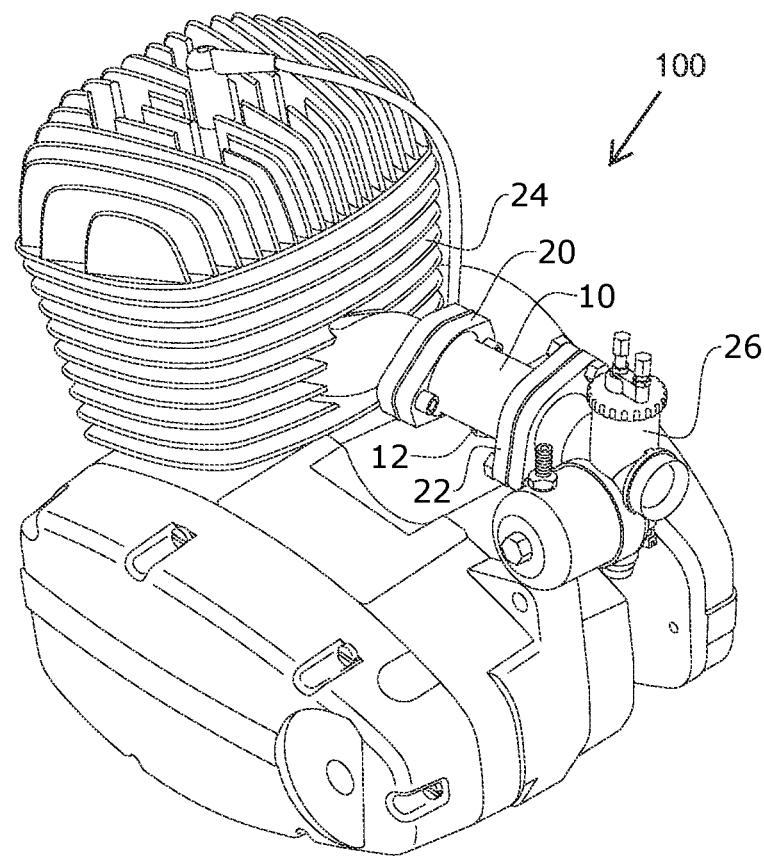
FIG. 1 is a perspective view of an exemplary embodiment of the present invention shown in use.
Figure 2:
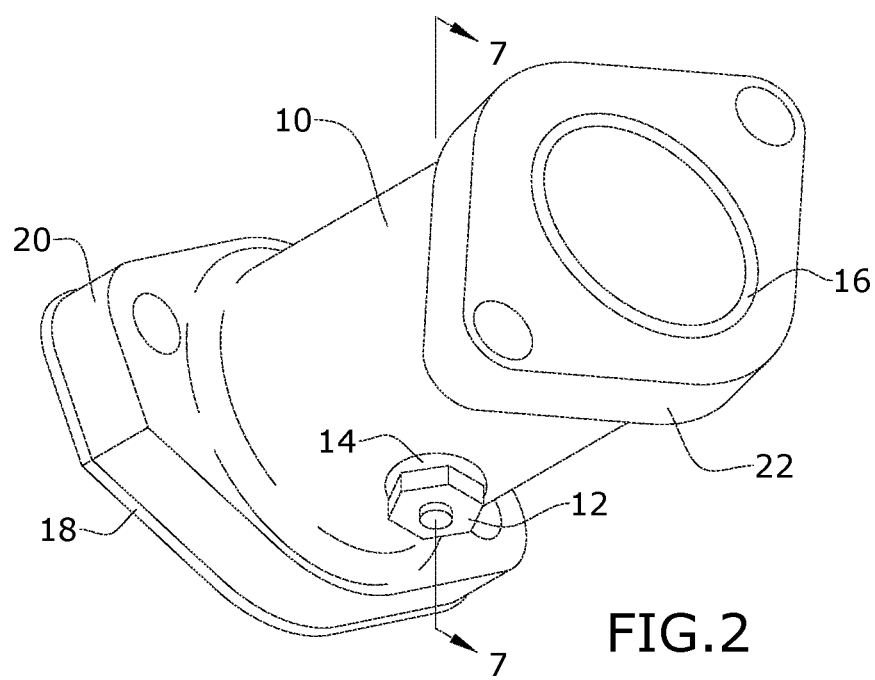
FIG. 2 is a bottom perspective view of an exemplary embodiment of an intake manifold of the present invention.
Figure 3:
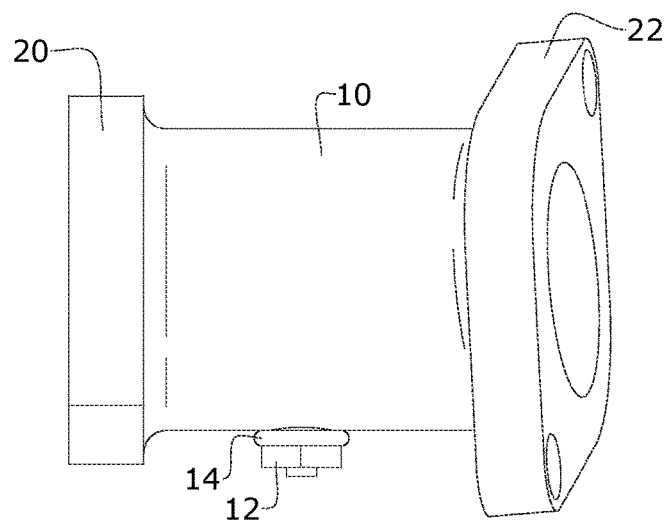
FIG. 3 is a front elevation view of an exemplary embodiment of the intake manifold of the present invention.
Figure 4:
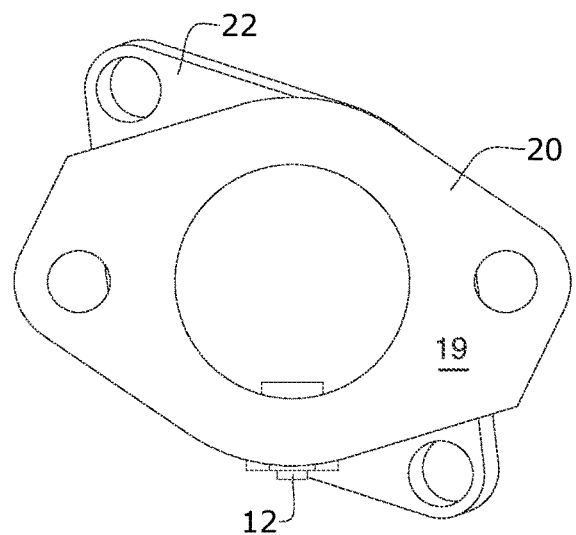
FIG. 4 is a left elevation view of an exemplary embodiment of the intake manifold of the present invention.
Figure 5:
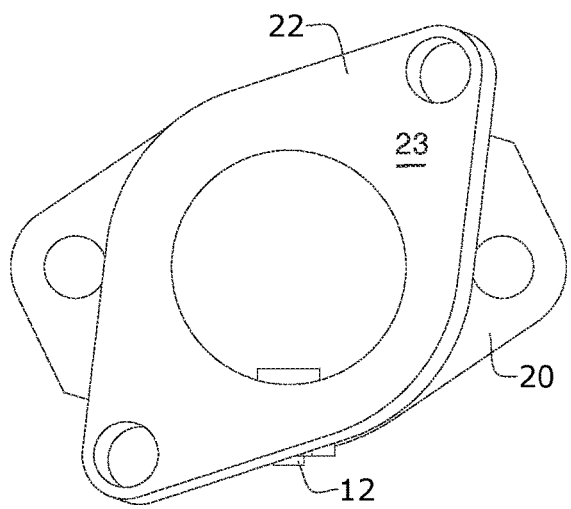
FIG. 5 is a right elevation view of an exemplary embodiment of the intake manifold of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an intake manifold with a blow off/pressure release valve, wherein the intake manifold may be a unitary construction of aluminum. The intake manifold utilizes a flat gasket at engine interface that, in combination with the aluminum construction, reduces the amount of heat transferred from the cylinder head to the intake manifold. The unitary construction of aluminum provides a strong bridge and conduit between the cylinder head and the carburetor.

Referring now to FIGS. 1 through 7, the present invention may include an intake manifold 10 with a blow off/pressure release valve 12. The intake manifold 100 is adapted to extend between the carburetor 26 and the engine 24 of an all-terrain vehicle (ATV). The intake manifold 100 provides a manifold tube 10 terminating at a carburetor flange 22 and an opposing engine flange 20 for interfacing the carburetor 26 and the engine 24, respectively. Each flange 20 and 22 may define a flange face/plane 19 and 23, respective, for said interfacing. An engine angle of the engine flange face 19 may be perpendicular relative to a direction in which the manifold tube 10 extends, while a carburetor angle of the carburetor flange face 23 may be obtuse and/or acute relative to the direction in which the manifold tube 10 extends. The manifold tube 10, the carburetor flange 22, and the engine flange 20 may be made of unitary construction of aluminum.

A flat gasket 18 may be dimensioned and adapted to be coextensive with the engine flange face 19 (the solid areas), wherein the material of the flat gasket is adapted to create a tight seal between the intake manifold 100 and the engine 24, preventing gaseous fuel and oxygen (or mixture thereof) from escaping therebetween. The flat gasket 18, due to its coextensive surface and its location sandwiched between the intake manifold 100 and the cylinder head, as well as its material properties is critical in reducing the amount of heat transferred from the engine to the intake manifold 100, which in turn can negatively modify the internal pressure of the said intake manifold 100. The flat gasket 18 can be made of a variety of different materials including cork paper, soft metal, rubber, and asbestos.

On the other side of the intake manifold 100, a carburetor O-ring gasket 16 may be dimensioned and adapted to enable a tight seal between the carburetor flange 22 and the carburetor 26. The carburetor flange face/plane 23 may be milled for the O-ring gasket 16 to operatively associate at the interface of the carburetor flange face/plane 23 and the carburetor 26.

Figure 6:
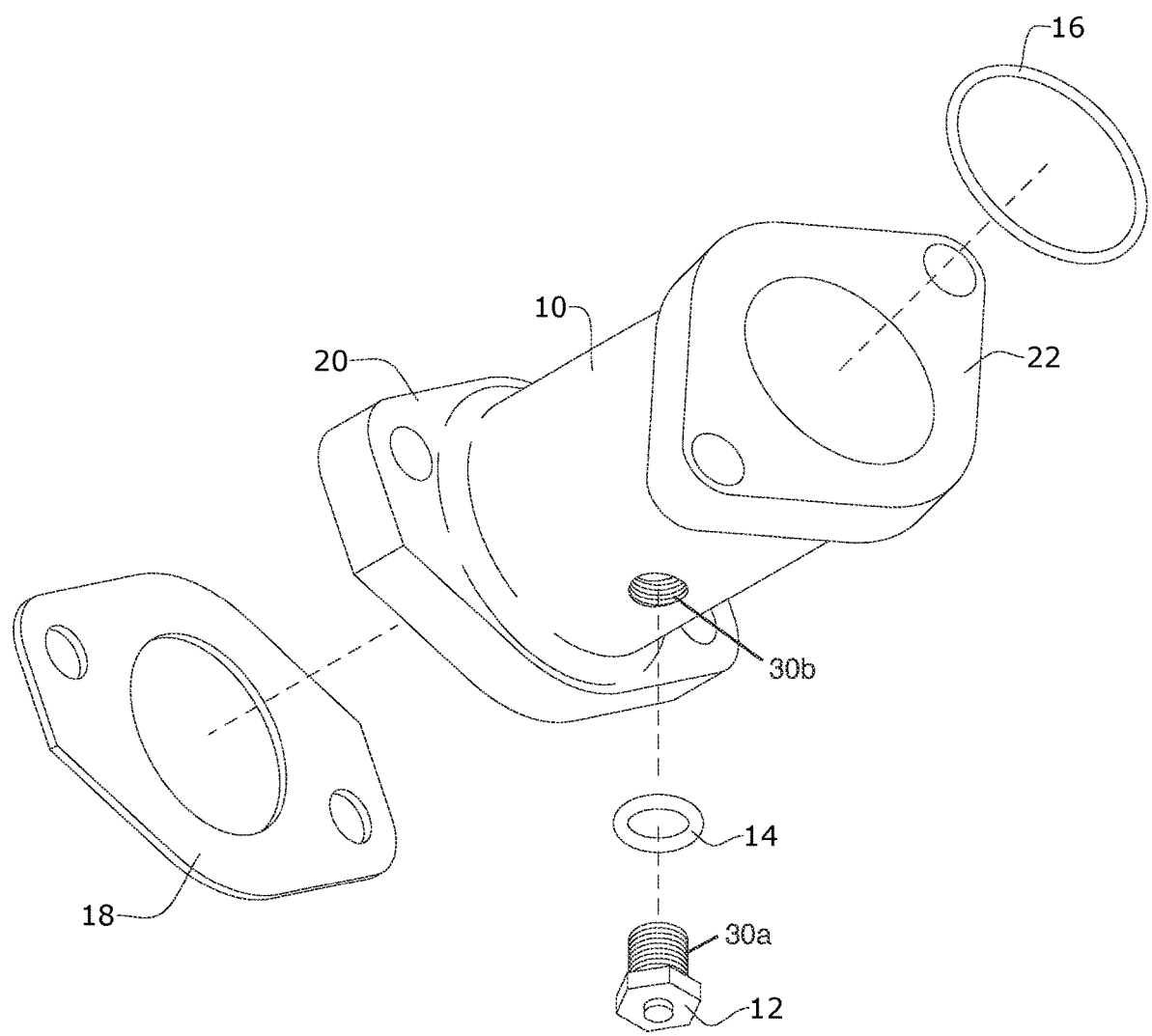
FIG. 6 is an exploded perspective view of an exemplary embodiment of the intake manifold of the present invention.
Figure 7:
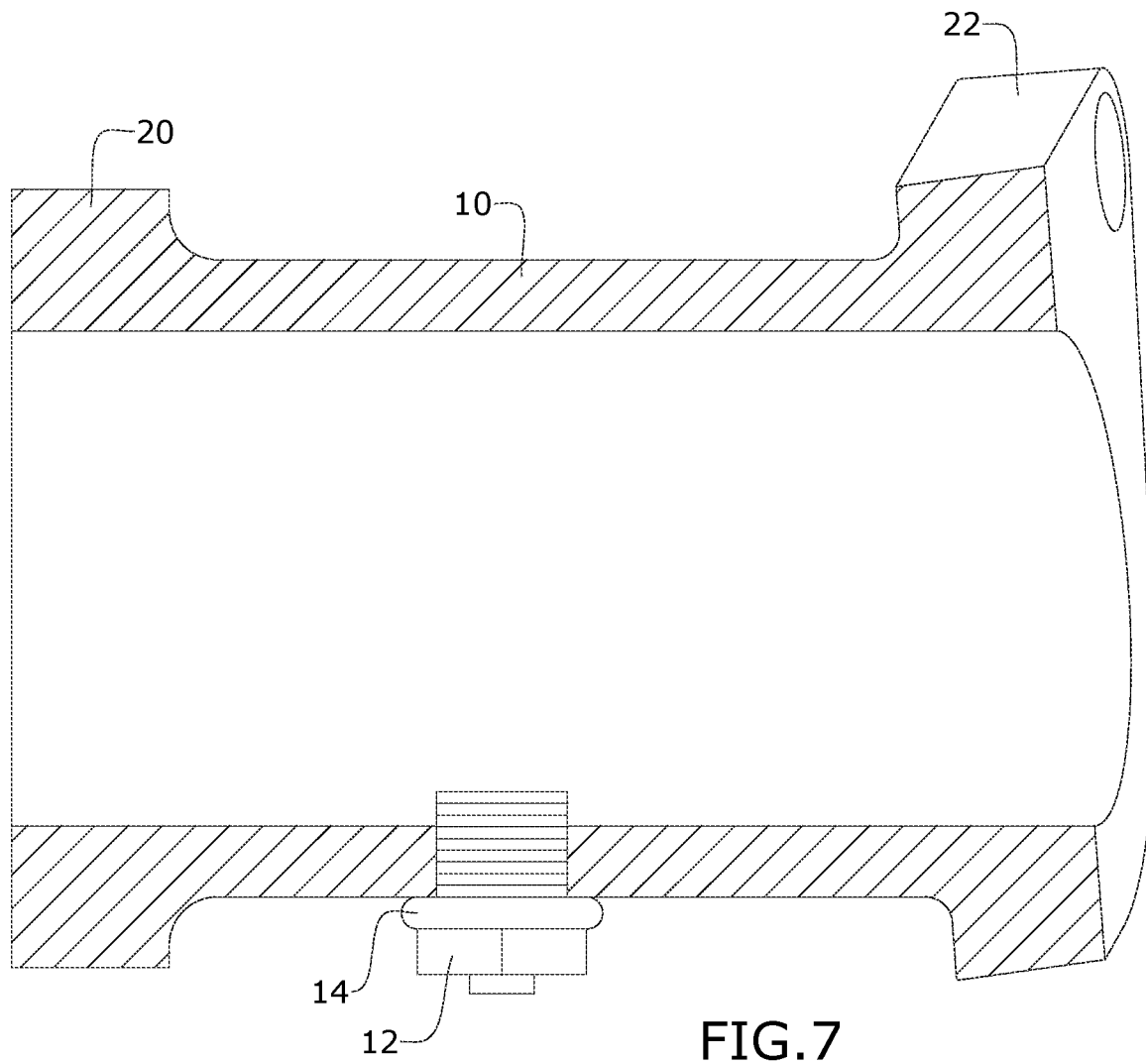
FIG. 7 is a section view of an exemplary embodiment of the intake manifold of the present invention, taken along line 7-7 in FIG. 2.

The pressure release valve 12 would be threaded (by way of first threads 30a along the valve and second threads 30b along the aperture in the manifold tube 10, as illustrated in FIG. 6) into the manifold tube 10 between the carburetor flange 22 and the opposing engine flange 20. The pressure release valve 12 is adapted to release pressure to the external environment from the internal portion of the manifold body 10, instead of allowed to be built up unchecked. A valve O-ring 14 may be disposed between the manifold tube 10 and the head of the pressure release valve 12. As a result, the intake manifold 100 is an "adapter" that allows the carburetor to fit to the motor. The pressure valve 12 is adapted to release any gases that escape into the intake manifold 100 that otherwise would damage the motor, carburetor, air system from a backfire.

A method of using the present invention may include the following. Providing the intake manifold 100 with a blow off/pressure release valve 12AS disclosed herein. A user would replace the existing intake manifold with the present invention. The user would have to remove the carburetor 26 by unscrewing the nuts that fasteners the carburetor to the intake manifold, then unbolt the old intake manifold from the cylinder head. The user may then reinstall the present invention by reversing the method of removing the existing intake.

Additionally, the present invention can be used with other motors, such as those used in a go-cart, golf cart or the like.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An intake manifold for an engine operatively associated with a carburetor, the intake manifold comprising: a manifold body extending between an engine flange and a carburetor flange, wherein the manifold body directly couples the engine and the carburetor a pressure release valve hole disposed in the manifold body between the engine flange and the carburetor flange; a first threading along the pressure release valve hole; and a pressure release valve is operatively associated with the pressure release valve hole to release an internal pressure within the manifold body above a predetermined threshold to an exterior environment.

2. The intake manifold of claim 1, further comprising a second threading along the pressure release valve, wherein the first threading and the second threading operatively associate.

3. The intake manifold of claim 2, wherein an engine face of the engine flange and a carburetor face of the carburetor flange are not parallel.

4. A method for fluidly connecting a carburetor and an engine of a vehicle, the system comprising: providing an intake manifold comprising: a manifold body extending between an engine flange and a carburetor flange, wherein the manifold body directly couples the engine and the carburetor, wherein an engine face of the engine flange and a carburetor face of the carburetor flange are not parallel; and a pressure release valve is operatively associated with the manifold body to release an internal pressure therein above a predetermined threshold to an exterior environment; and fluidly sealing the engine face to the engine with a planar gasket having a surface approximately coextensive with the engine face.

5. The method of claim 4, further comprising: sealing the carburetor flange to the carburetor by way of an O-ring.

\* \* \* \* \*